US011165977B2

(12) United States Patent
Geurts et al.

(10) Patent No.: US 11,165,977 B2
(45) Date of Patent: Nov. 2, 2021

(54) IMAGING SYSTEMS AND METHODS FOR GENERATING HIGH DYNAMIC RANGE IMAGES

(71) Applicant: SEMICONDUCTOR COMPONENTS INDUSTRIES, LLC, Phoenix, AZ (US)

(72) Inventors: Tomas Geurts, Haasrode (BE); Manuel H. Innocent, Wezemaal (BE); Robert Michael Guidash, Rochester, NY (US); Genis Chapinal, Antwerp (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/860,327

(22) Filed: Apr. 28, 2020

(65) Prior Publication Data

US 2021/0029312 A1   Jan. 28, 2021

Related U.S. Application Data

(60) Provisional application No. 62/876,931, filed on Jul. 22, 2019.

(51) Int. Cl.
*H04N 5/355* (2011.01)
*H04N 5/378* (2011.01)
*H04N 5/357* (2011.01)

(52) U.S. Cl.
CPC ......... *H04N 5/3559* (2013.01); *H04N 5/3575* (2013.01); *H04N 5/378* (2013.01)

(58) Field of Classification Search
CPC .... H04N 5/3559; H04N 5/378; H04N 5/3575; H04N 5/37452; H04N 5/3591
See application file for complete search history.

(56) References Cited

U.S. PATENT DOCUMENTS

| 8,866,059 | B2 | 10/2014 | Murata et al. |
| 9,942,492 | B2 | 4/2018 | Innocent et al. |

(Continued)

OTHER PUBLICATIONS

Sakano et al., "224-ke Saturation signal global shutter CMOS image sensor with in-pixel pinned storage and lateral overflow integration capacitor," 2017 Symposium on VLSI Circuits, Kyoto, 2017, pp. C250-C251.

(Continued)

*Primary Examiner* — Nhan T Tran
(74) *Attorney, Agent, or Firm* — Treyz Law Group, P.C.; Tianyi He

(57) ABSTRACT

An imaging system may include an image sensor having an image sensor. The image sensor may include an image sensor pixel array coupled to row control circuitry and column readout circuitry. The image sensor pixel array may include a plurality of image sensor pixels. Each image sensor pixel may include a photosensitive element configured to generate charge in response to incident light, a first charge storage structure configured to accumulate an overflow portion of the generated charge for a low gain signal and a second charge storage structure configured to store a remaining portion of the generated charge for a high gain signal. Each image sensor pixel may also include a dedicated overflow charge storage structure interposed between the first charge storage structure and a floating diffusion region.

20 Claims, 7 Drawing Sheets

(56) References Cited

U.S. PATENT DOCUMENTS

| | | | |
|---|---|---|---|
| 2016/0360127 A1 | 12/2016 | Dierickx et al. | |
| 2017/0150017 A1* | 5/2017 | Geurts | H04N 5/37452 |
| 2017/0350755 A1* | 12/2017 | Geurts | H04N 5/37452 |
| 2017/0366764 A1* | 12/2017 | Innocent | H04N 5/3559 |
| 2018/0288343 A1* | 10/2018 | McCarten | H04N 5/37452 |
| 2019/0166291 A1* | 5/2019 | Magnani | H04N 5/3594 |
| 2019/0260949 A1* | 8/2019 | Geurts | H04N 5/378 |
| 2020/0154066 A1* | 5/2020 | Johnson | H04N 5/3559 |
| 2020/0227454 A1* | 7/2020 | Geurts | H04N 5/3745 |

OTHER PUBLICATIONS

Sakai et al., "A 2.8 µm Pixel-pitch 55 ke-Full-Well Capacity Global-Shutter CMOS Image Sensor Using Lateral Overflow Integration Capacitor," Japan. J. Appl Phys., 2013, pp. 52.

Koifman, Image Sensors World, "Caeleste MAF HDR GS BSI Rad-Hard Sensor," Apr. 26, 2019, Retrieved from the Internet: <http://image-sensors-world.blogspot.com/2019/04/caeleste-maf-hdr-gs-bsi-rad-hard-sensor.html>.

* cited by examiner

IMAGING SYSTEMS AND METHODS FOR GENERATING HIGH DYNAMIC RANGE IMAGES

This application claims the benefit of and claims priority to U.S. Provisional Patent Application No. 62/876,931, filed on Jul. 22, 2019, which is hereby incorporated by reference herein in its entirety.

BACKGROUND

This relates generally to imaging devices, and more particularly, to imaging devices having image sensor pixels with high dynamic range functionalities.

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

A typical image pixel contains a photodiode for generating charge in response to incident light. The image pixel can also include a charge storage region for storing charge that is generated at the photodiode. Image sensors can be equipped with multi-exposure high dynamic range (HDR) functionality, where multiple frames are captured with an image sensor at different exposure times and are used to generate a single HDR image. However, this approach requires multiple exposures and additional frame storage. Image sensors can also implement HDR functionality in other manners, such as generating multiple image signals useable to generate an HDR image based on a single integration time. However, depending on how the generated image signals are stored, leakage and noise may be amplified and may degrade the image signals.

It would therefore be desirable to provide imaging devices with improved image sensor pixels that address these issues.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
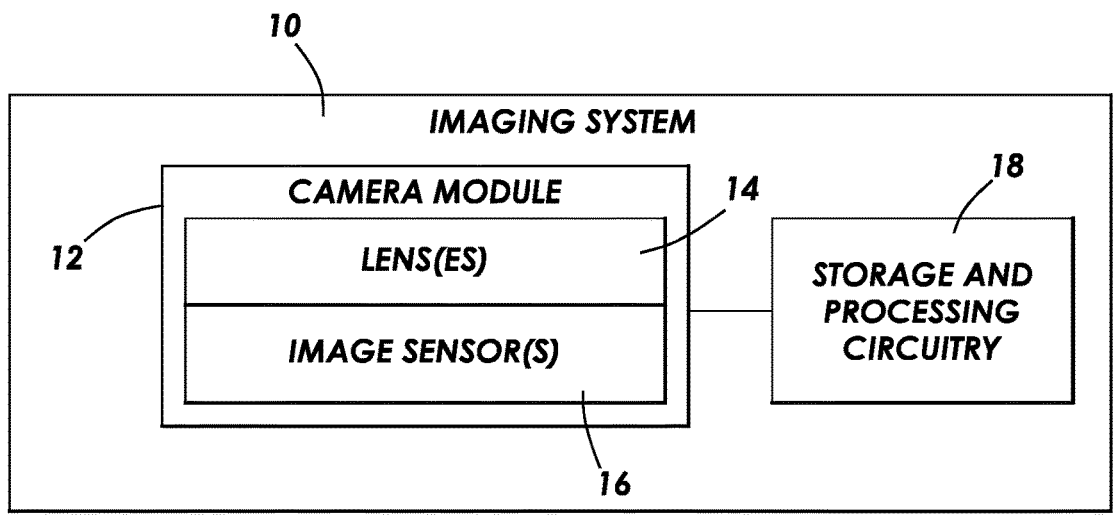
FIG. 1 is a diagram of an illustrative electronic device having an image sensor and processing circuitry for capturing images in accordance with some embodiments.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
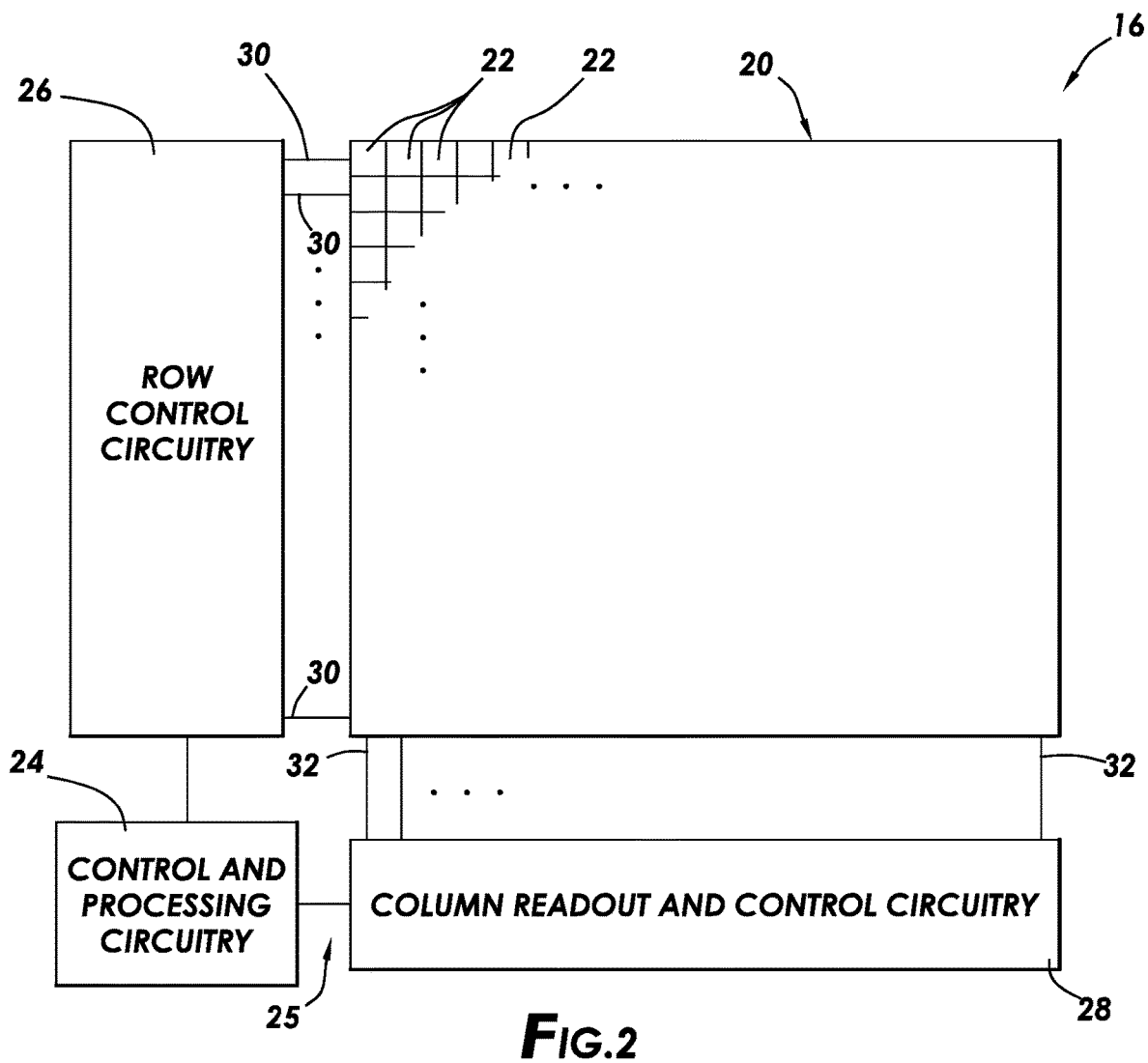
FIG. 2 is a diagram of an illustrative pixel array and associated readout circuitry for reading out image signals from the pixel array in accordance with some embodiments.

As shown in FIG. 2, image sensor 16 may include a pixel array 20 containing image sensor pixels 22 arranged in rows and columns (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

Photosensitive elements within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 22.

Figure 3:
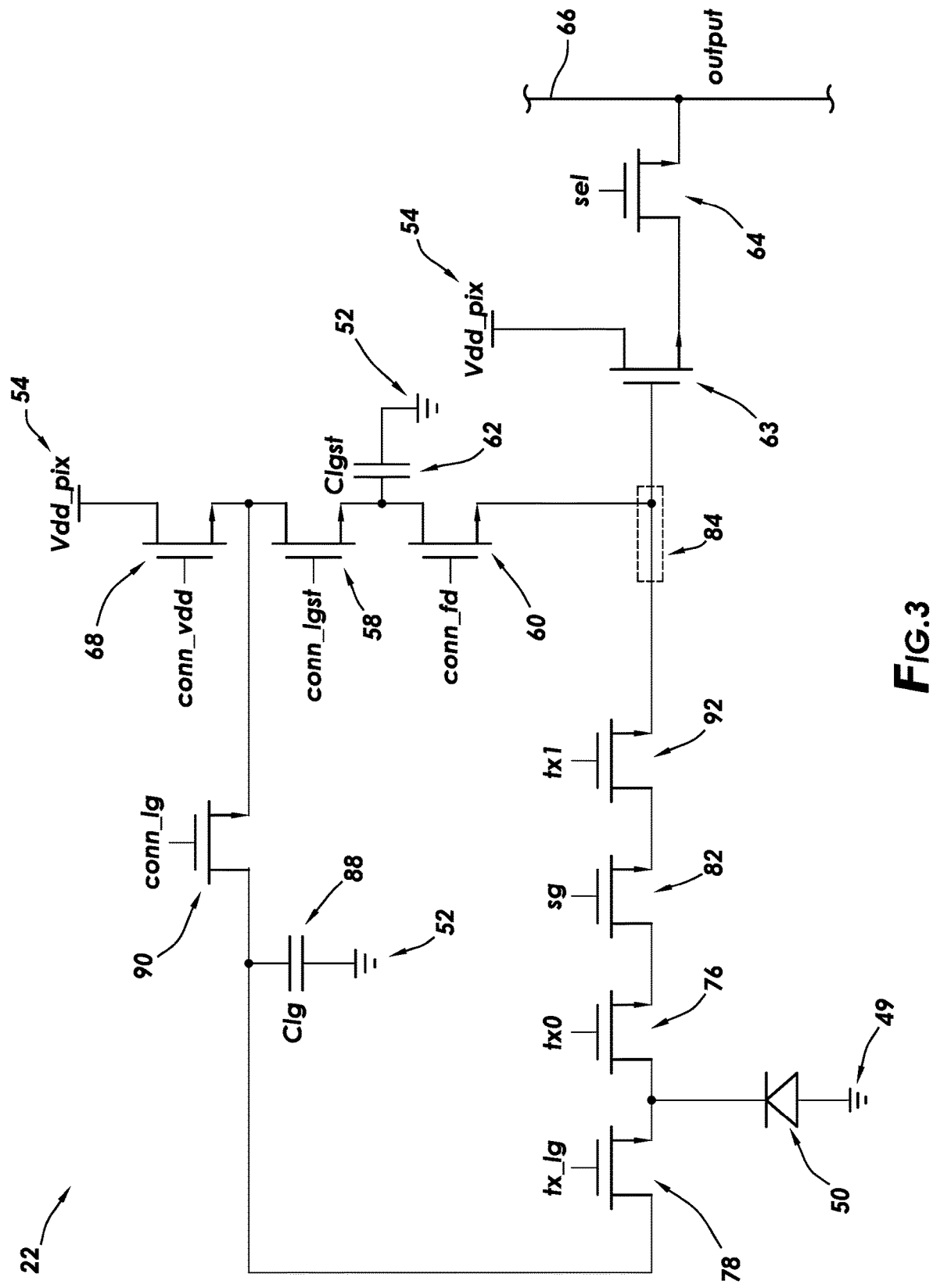
FIG. 3 is a circuit diagram of an illustrative pixel having a dedicated storage structure for accumulated overflow charge in accordance with some embodiments.

FIG. 3 shows an illustrative image sensor pixel that may be implemented in pixel array 20 in FIG. 2. Pixel 22 in FIG. 3 may include a photosensitive element such as photodiode 50. Photodiode 50 may receive incident light over a period of time (e.g., an exposure time period) and may generate an image charge (i.e., electric charge) corresponding to the incident light over the exposure time period. Photodiode 50 may be coupled to voltage source 49 supplying a grounding voltage (sometimes referred to herein as a first supply voltage). A voltage source may sometimes be referred to herein as a power supply.

Photodiode 50 may be coupled to a charge storage structure such as storage gate 82 via transistor 76. Storage gate 82 may be coupled to a charge storage structure such as floating diffusion region 84 via transistor 92. Additionally, photodiode 50 may be coupled to a charge storage structure such as capacitor 88 via transistor 78. Capacitor 88 may be coupled to floating diffusion region 84 via at least transistor 90. In particular, capacitor 88 may have a first terminal coupled to voltage source 52 and a second terminal electrically connected to transistor 90. Floating diffusion region 84 may have an associated charge storage capacity or capacitance (not explicitly showing in FIG. 3).

As examples, voltage source 52 may be the same voltage source as the voltage source coupled to photodiode 50, a voltage source supplying a grounding voltage, a different voltage source that provides a different supply voltage (e.g., a reference supply voltage). If desired, voltage source 52 may provide a pulsed voltage signal (e.g., a voltage signal that remains at a first voltage level and may periodically be pulsed to a second voltage level) instead of a fixed voltage level (e.g., a fixed grounding supply voltage or a fixed reference supply voltage).

Capacitor 88 may accumulate (e.g., store) overflow charge generated by photodiode 50 at its second terminal. In particular, transistor 78 may set an overflow charge barrier (e.g., a potential barrier, a voltage barrier, etc.) that determines an amount of overflow charge transferred from photodiode 50 to capacitor 88. In particular, the overflow charge barrier may determine an overflow portion of the total charge generated by photodiode 50 during a single exposure time period (e.g., for a given image frame). In other words, the overflow portion of the charge generated by photodiode 50 may pass through transistor 78 to capacitor 88. As examples, transistor 78 may be partially asserted periodically to periodically provide the overflow charge barrier, may be partially asserted continuously to continuously provide the overflow charge barrier, may be implemented with a structure inherently providing the overflow charge barrier, or may provide the overflow charge barrier in any desired manner.

Storage gate 82 may store a second amount of charge generated by photodiode 50. In particular, transistor 76 may transfer a remaining portion of the total charge generated by photodiode 50 during the single exposure time period (e.g., for the same given image frame) to storage gate 82. In other words, the total amount of charge generated by photodiode 50 for the exposure time period may be the sum of the overflow charge portion and the remaining charge portion. The overflow portion of the total charge may form a low gain image signal, and the remaining portion of the total charge may form a high gain image signal. In other words, the overflow portion may be useable in a relatively high light environment, and the remaining portion may be useable in a relatively low light environment (e.g., relative to the high light environment). An HDR image may be constructed based on the low gain and high gain image signals (e.g., based on a linear combination of the low gain and high gain image signals).

Issues may arise in configurations where the accumulated or integrated charge at a low gain capacitor, such as capacitor 88 in FIG. 3, is directly shared with the floating diffusion region (in a configuration not shown in FIG. 3) during readout. In such configurations, the stored (low gain signal) voltage at capacitor 88 may be shared with the floating diffusion region during a readout operation in a global shutter mode of operation. The charge at the floating diffusion region may subsequently be sampled during the readout operation. However, dark current noise at the floating diffusion region and thermal (kTC) noise can be undesirably amplified relative to the image signal during this charge sharing and storage time because the low gain capacitor capacitance can be significantly larger (e.g., about ten times larger) than the floating diffusion region capacitance.

In particular, during the charge sharing operation, the effective charge stored at the floating diffusion region is only a fraction of the overflow charge depending on the ratio of the low gain capacitor capacitance to the floating diffusion region capacitance. Because the charge associated with the image signal is attenuated during this charge sharing operation, noise effects become more significant. Put another way, when the image signal stored at the floating diffusion region (associated with only a fraction of the overflow charge) is sampled and amplified, the noise component is similarly amplified.

To mitigate these issues, pixel 22 in FIG. 3 may include a charge storage structure such as capacitor 62 (sometimes described as a dedicated charge storage structure for overflow charge). Capacitor 62 may receive and store the accumulated overflow charge from capacitor 88. Capacitor 62 may subsequently provide the stored overflow charge to floating diffusion region 84 (e.g., may perform charge sharing with floating diffusion region 84) during signal sampling or readout operation. Because the capacitance of capacitor 88 may be similar to the capacitance of capacitor 62 (e.g., both having the same capacitance, having capacitances within 10% of each other, having capacitances within 20% of each other, within 50% of each other, within 70% of each other, etc.), there is relatively low amplification of noise relative to the (low gain) image signal when transferring charge from capacitor 88 to capacitor 62. The (low gain) image signal may then subsequently be sampled and read out from capacitor 62 and floating diffusion region 84.

In particular, capacitor 62 may be coupled between capacitor 88 and floating diffusion region 84. More specifically, capacitor 62 may have a first terminal coupled to voltage source 52 (e.g., supplying the same first supply voltage as that is supplied to photodiode 50, supplying a grounding voltage, supplying any other suitable supply voltage, supplying variable supply voltages, etc.) and a second terminal coupled between transistors 58 and 60. If desired, voltage source 52 coupled to capacitor 62 may provide a pulsed voltage signal (e.g., a signal exhibiting periodic pulses between two different voltage levels). Capacitor 88 may be electrically connected to the second terminal of capacitor 62 through transistors 90 and 58. The second terminal of capacitor 62 may be electrically connected to floating diffusion region 84 through transistor 60.

Capacitor 88 may be coupled to voltage source 54 (e.g., supplying a second supply voltage different than the first supply voltage or the grounding voltage) through transistors 90 and 68. The second terminal of capacitor 62 may be coupled to voltage source 54 through transistors 58 and 68. Floating diffusion region 84 may be coupled to voltage source 54 through transistors 60, 58, and 68. This path that connects floating diffusion region 84 to voltage source 54 may be sometimes referred to herein as a floating diffusion region reset path. Photodiode 50 may be coupled to voltage source 54 through transistors 78, 90, and 68. This path that connects photodiode 50 to voltage source 54 may be sometimes referred to herein as a blooming path for photodiode 50 (e.g., a path on which undesired excess charge from photodiode 50 may be removed).

Additionally, pixel 22 may include readout circuitry such as source follower transistor 63 and row select transistor 64. In particular, floating diffusion region 84 may be coupled to a gate terminal of transistor 63. Transistor 63 may have a first source-drain terminal (i.e., one of a source terminal or a drain terminal for the transistor) coupled to voltage source 54 (or any other suitable voltage source supplying any suitable reference voltage) and a second source-drain terminal (i.e., the other one of the source terminal or the drain terminal for the transistor) coupled to transistor 64. Transistor 64 may couple transistor 63 to a pixel output path such as column line 66 (e.g., column line 32 in FIG. 2). In particular, when transistor 64 is activated, transistor 63 may pass an image signal corresponding to the charge stored at floating diffusion region 84 to the pixel output path. As examples, the charge stored at floating diffusion region 84 and the corresponding image signal passed to the pixel output path may be associated with one of a low gain image signal, a high gain image signal, one or more reset level signals for the low or high gain signals, a reference level signal, etc.

In some scenarios, it may be desirable to eliminate one or more transistor from pixel 22 in FIG. 3 to form a more compact pixel implementation (or yield other desirable pixel characteristics). As an example, array 20 in FIG. 2 may include pixel 22 in FIG. 4. Pixel 22 in FIG. 4 may have some of the same (or similar) elements implemented in the same (or similar) configurations as in pixel 22 in FIG. 3. In order to not unnecessarily obscure the embodiments of FIG. 4, descriptions for these similar elements and their similar configurations are omitted. These similar elements may have similar functions, configurations, modes of operation, etc., as previously described (e.g., in connection with FIG. 3) unless otherwise specified.

Figure 4:
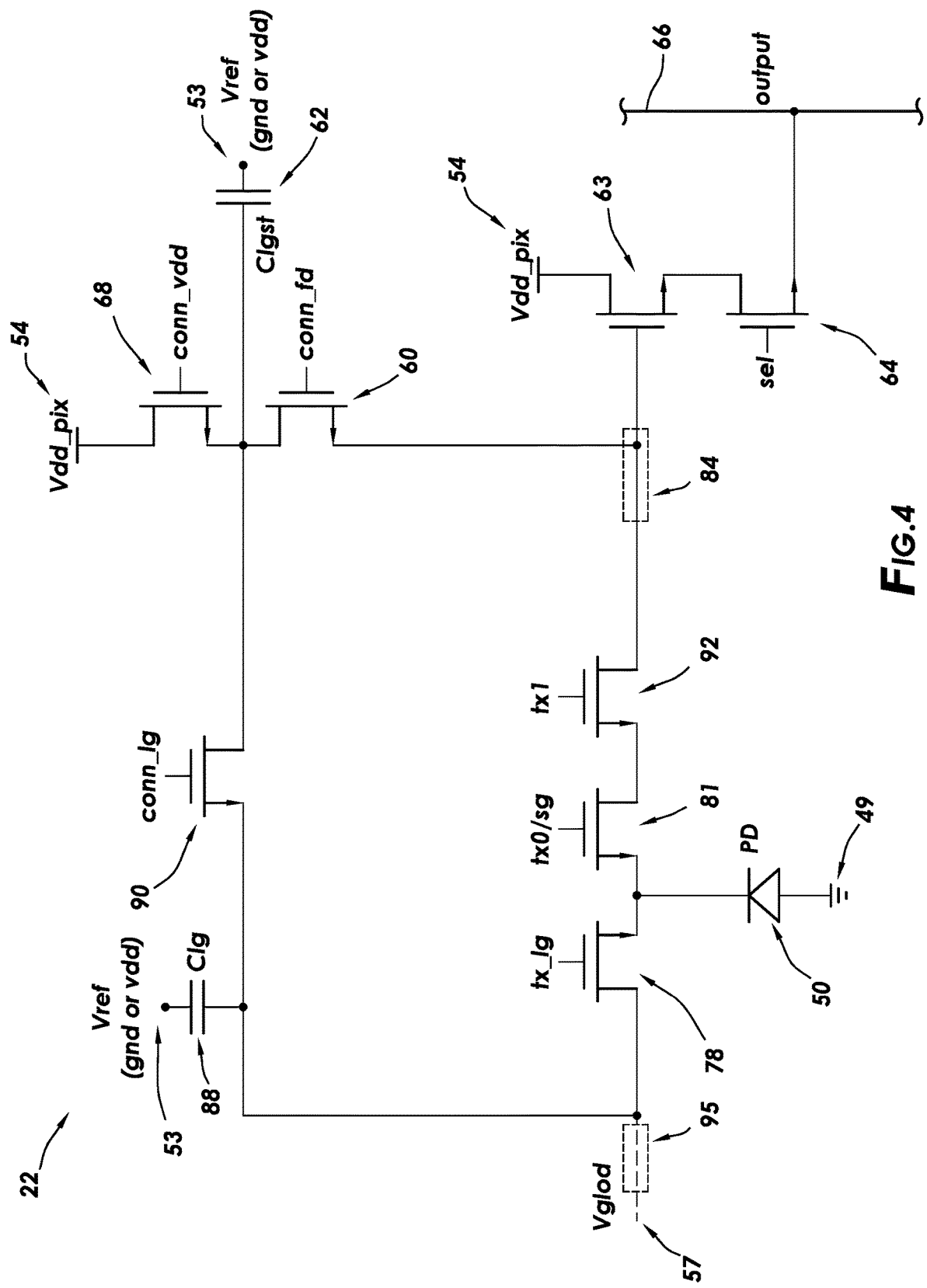
FIG. 4 is a circuit diagram of an illustrative pixel having a dedicated storage structure for accumulated overflow charge and a separate photosensitive element blooming path in accordance with some embodiments.

In particular, pixel 22 in FIG. 4 may omit transistor 58 relative to pixel 22 in FIG. 3. As shown in FIG. 4, capacitor 62 may have a first terminal coupled to voltage source 53 supplying voltage Vref. As examples, voltage Vref may be a grounding voltage, a supply voltage, any other reference voltage, or may be a variable/adjustable voltage. If desired, voltage source 53 coupled to capacitor 62 may provide a pulsed voltage signal (e.g., a signal exhibiting periodic pulses between two different voltage levels). Capacitor 62 may have a second terminal interposed between transistors 68 and 60. Capacitor 88 may have a first terminal coupled to voltage source 53 supplying voltage Vref and a second terminal electrically connected to transistor 90. Transistor 90 (with no other intervening transistors) may couple the second terminal of capacitor 88 to the second terminal of capacitor 62. If desired, voltage source 53 coupled to capacitor 88 may provide a pulsed voltage signal (e.g., a signal exhibiting periodic pulses between two different voltage levels).

By removing transistor 58 from pixel 22 in FIG. 4, the blooming path (through transistors 90 and 68) for photodiode 50 (as described in connection with FIG. 3) may undesirably cross the charge storage terminal of capacitor 62. As such, pixel 22 in FIG. 4 may include a separate blooming path for photodiode 50. In particular, transistor 78 and virtual gate lateral overflow drain (vglod) 95 may connect photodiode 50 to voltage source 57 (e.g., may be interposed between photodiode 50 and voltage source 57). The voltage source 57 may supply a variable/adjustable voltage, may supply a time variant voltage, may be the same as voltage source 54, may supply any suitable voltage. If desired, structure 95 may be implemented as an (antiblooming) transistor or any other suitable structure.

Additionally, in FIG. 4, transistors 76 and 82 (separately depicted in FIG. 3) are collectively shown in a single transistor structure 81. Transistor structure 81 may serve the same functions as transistors 76 and/or 81 in FIG. 3 (e.g., the charge transfer and charge storage functions for the high gain charge). If desired, transistor structure 81 may be implemented as a single storage gate (e.g., transistor 76 in FIG. 3 may be omitted). While shown for pixel 22 in FIG. 4, the omission of transistor 76 may also be implemented in pixel 22 in FIG. 3.

Referring back to FIG. 3, capacitor 62 in FIG. 3 may be coupled along the floating diffusion region reset path (e.g., the path along which transistors 60, 58, and 68 are coupled). Capacitor 62 being coupled to the floating diffusion region reset path undesirably restricts timing for resetting capacitor 62 and floating diffusion region 84 (e.g., to a reset level voltage or a supply voltage supplied by voltage source 54. More specifically, in such a configuration, whenever floating diffusion region 84 is to be reset, (the storage terminal of) capacitor 62 must be reset as well. This is similarly the case for pixel 22 in FIG. 4. The inflexibility of these pixel configurations may lead to undesirable restrictions in some applications.

As such, it may be desirable to provide pixels having a separate floating diffusion region reset path (e.g., to separate or decouple capacitor 62 from the floating diffusion region reset path). As an example, array 20 in FIG. 2 may include pixel 22 in FIG. 5. Pixel 22 in FIG. 5 may have some of the same (or similar) elements implemented in the same (or similar) configurations as in pixel 22 in FIG. 3 (and in other figures). In order to not unnecessarily obscure the embodiments of FIG. 5, descriptions for these similar elements and their similar configurations are omitted. These similar elements may have the similar functions, configurations, modes of operation, etc., as previously described (e.g., in connection with FIGS. 3 and 4) unless otherwise specified.

Figure 5:
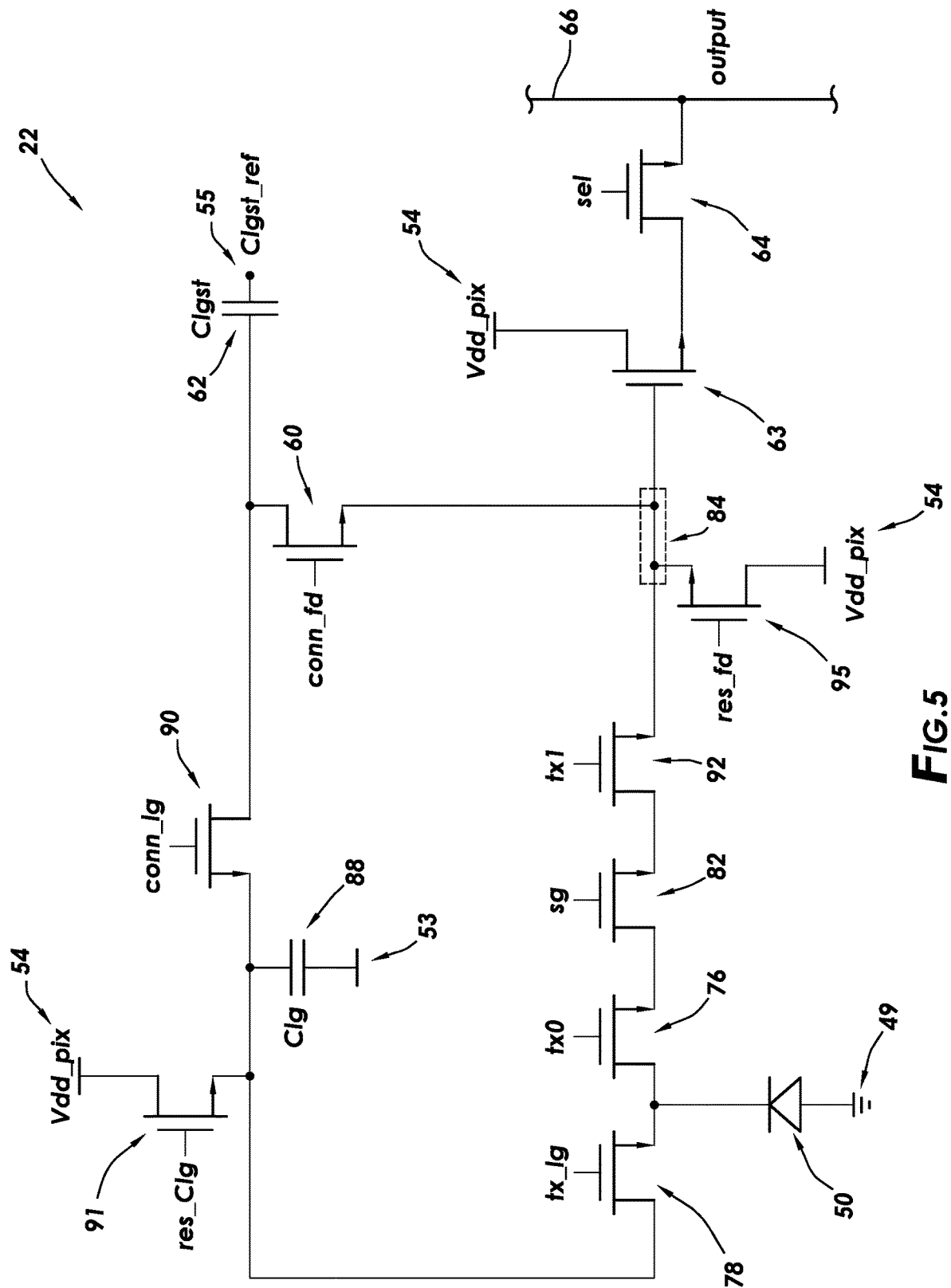
FIG. 5 is a circuit diagram of an illustrative pixel having a dedicated storage structure for accumulated overflow charge and a separate floating diffusion region reset path in accordance with some embodiments.

As shown in FIG. 5, pixel 22 in FIG. 5 may omit transistor 58 relative to pixel 22 in FIG. 3. In particular, a first terminal of capacitor 62 may be coupled to voltage source 55 supplying voltage Clgst_ref. Voltage Clgst_ref may be the same voltage as voltage Vref in FIG. 4 or may be any suitable voltage (e.g., may be a pulsed voltage signal, may be a fixed reference supply voltage, etc.). A second terminal of capacitor 62 may be coupled to (e.g., electrically connected to) capacitor 88 via transistor 90 and coupled to (e.g., electrically connected to) floating diffusion region 84 via transistor 60. In other words, capacitor 62 (e.g., the second terminal of capacitor 62) may be interposed between capacitor 88 and floating diffusion region 84.

Transistor 95 may couple floating diffusion region 84 directly to voltage source 54. In other words, capacitor 62 is not coupled along the floating diffusion region reset path in the pixel configuration of FIG. 5. Additionally, a first terminal of capacitor 88 may be coupled to voltage source 53. A second terminal of capacitor 88 may be connected to voltage source 54 via transistor 91 (configured to reset the second terminal of capacitor 88 to a reference voltage supplied by voltage source 54 when active). Photodiode 50 may be coupled to voltage source 54 via transistors 78 and 91, thereby forming a blooming path separate from capacitor 62 (e.g., a storage terminal of capacitor 62 is not along the blooming path.

Voltage sources 49, 53, 54, and 55 may each provide any suitable supply voltage. Each supply voltage may be different from one another, or two or more of these supply voltages may be the same. If desired, one or more of these supply voltages may be at a fixed voltage level, while one or more of these supply voltages may be variable (e.g., may be pulsed between two or more supply voltage levels). As a particular example, voltage source may supply a ground supply voltage, voltage source 54 may supply a power supply voltage, and voltage sources 53 and 55 may supply the same (fixed) reference supply voltages (e.g., one of the power and/or ground supply voltages). Alternatively, voltage sources 53 and 55 may supply different (fixed) reference voltages. These descriptions for supply voltages in pixel 22 may generally be applicable to any of the pixels 22 in FIGS. 3-6.

In the configuration of FIG. 5, floating diffusion region 84 may include three separate connections (not including the connection to source follower transistor 63): a connection to transistor 60, a connection to transistor 92, and a connection to transistor 95. Because of the increase in the number of connections to floating diffusion region 84 in FIG. 5, relative to those of FIGS. 3 and 4, floating diffusion region 84 in FIG. 5 may be implemented with an increase in size and/or capacitance to accommodate the extra connections. This may lead to an increase in leakage and noise at floating diffusion region 84 in FIG. 5, and may also lead to a decrease in conversion gain or conversion factor, adversely affecting low light performance. In some applications, it may be desirable to mitigate these issues while still providing a floating diffusion region reset path separate from capacitor 62.

Figure 6:
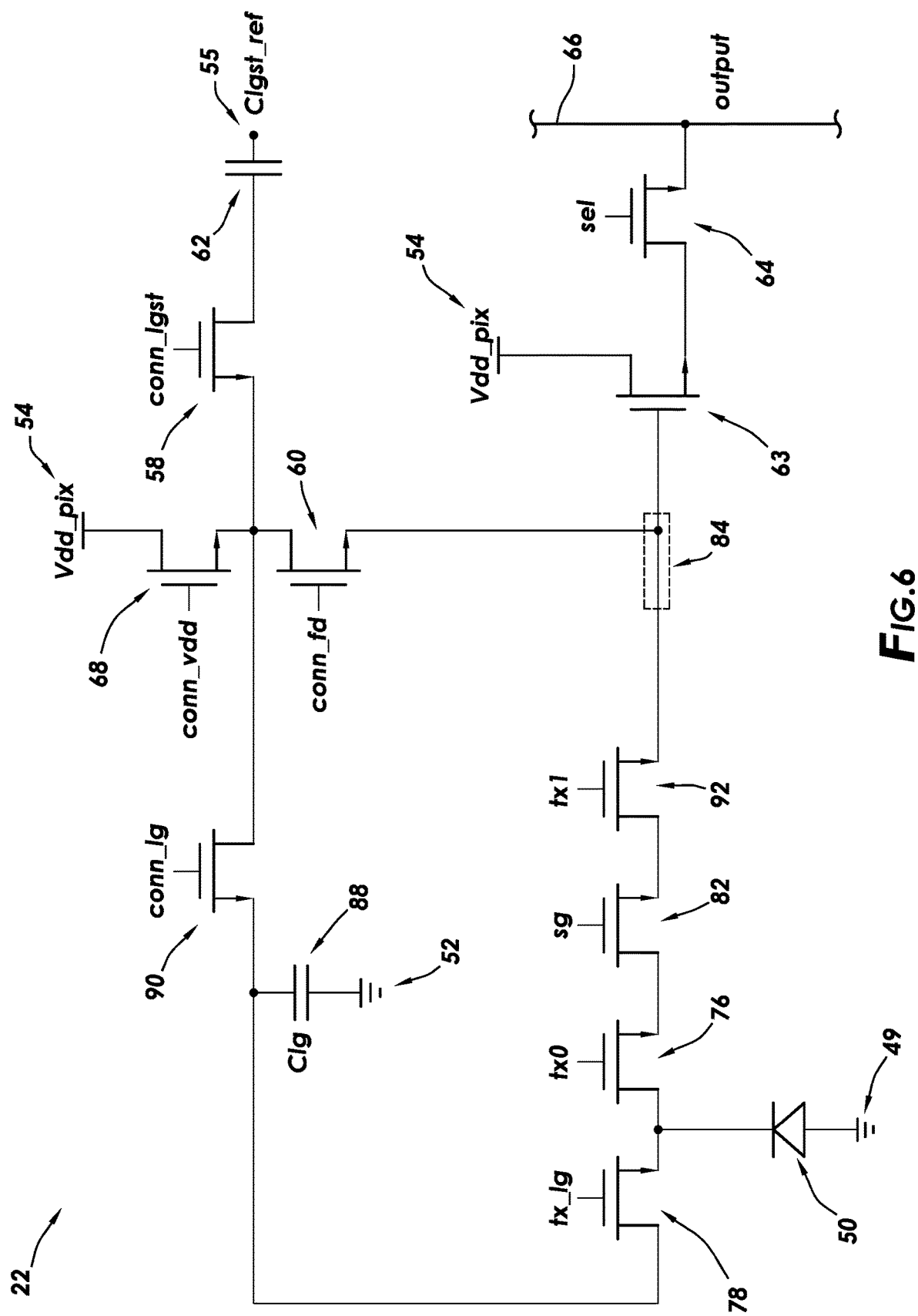
FIG. 6 is a circuit diagram of an illustrative pixel having a dedicated storage structure for accumulated overflow charge and a compact floating diffusion region reset path in accordance with some embodiments.

As an example, array 20 in FIG. 2 may include pixel 22 in FIG. 6. Pixel 22 in FIG. 6 may have some of the same (or similar) elements implemented in the same (or similar) configurations as in pixel 22 in FIG. 3 (and in other figures). In order to not unnecessarily obscure the embodiments of FIG. 6, description for these similar elements and their similar configurations are omitted. These similar elements may have the same or similar functions, configurations, modes of operation, etc., as previously described (e.g., in connection with FIGS. 3, 4, and 5) unless otherwise specified.

As shown in FIG. 6, transistor 60 may be directly coupled to transistor 68 (e.g., similar to the configuration of pixel 22 in FIG. 4). In other words, a source-drain (i.e., source or drain) terminal of transistor 60 may share a common node with a source-drain terminal of transistor 68. The common node may also be shared with a source-drain terminal of transistor 90 and a source-drain terminal of transistor 58.

Configured in this manner, pixel 22 in FIG. 6 may have a floating diffusion region reset path (e.g., along which transistors 60 and 68 are coupled) that is separated from capacitor 62 by transistor 58. Pixel 22 in FIG. 6 may also have a blooming path for photodiode 50 (e.g., along which transistors 78, 90, and 68 are coupled) that is separated from capacitor 62 by transistor 58. Capacitor 88 may still first convey (e.g., transfer) accumulated overflow charge to capacitor 62 by activating transistors 90 and 58. Subsequently, the overflow charge may be conveyed to (e.g., shared with) floating diffusion region 84 by activating transistors 58 and 60 (while transistors 90 and 68 are deactivated), and the overflow charge may be sampled via floating diffusion region 84 by readout circuitry.

Figure 7A:
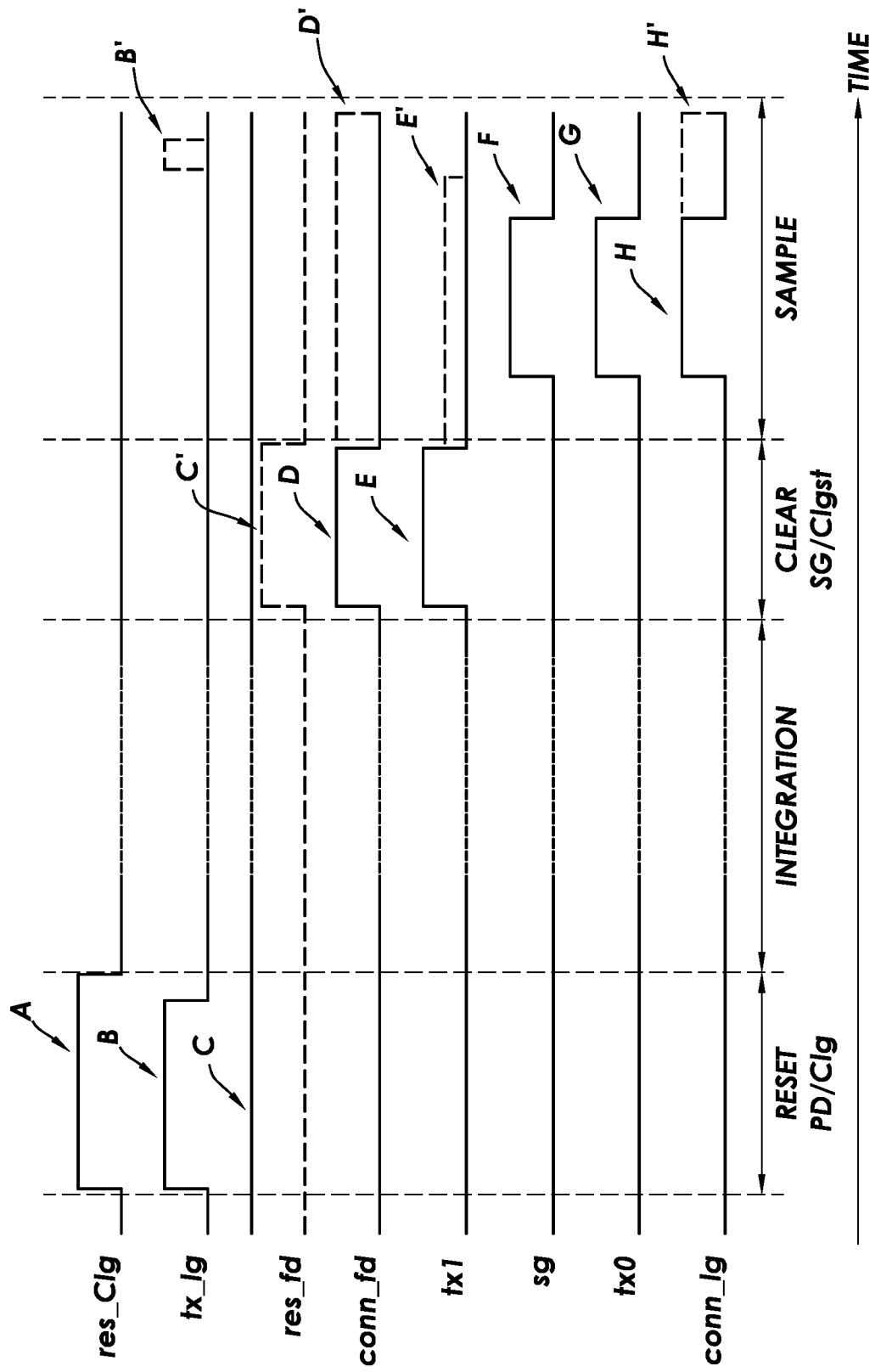
FIGS. 7A and 7B are illustrative timing diagrams for operating an illustrative pixel having a dedicated storage structure for accumulating overflow charge in accordance with some embodiments.
Figure 7B:
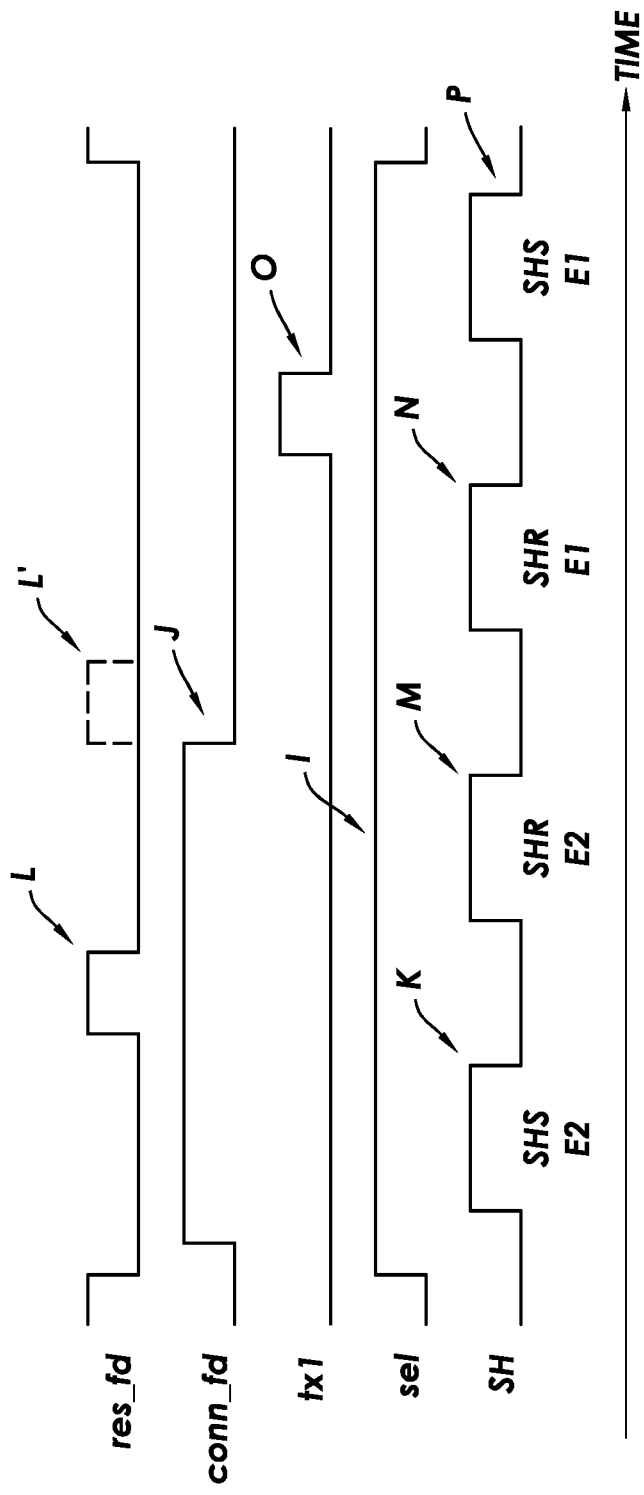

FIGS. 7A and 7B show illustrative timing diagrams for operating an illustrative pixel having a dedicated overflow charge storage structure. As an example, the timing diagrams of FIGS. 7A and 7B may be used to operate an image sensor array having image pixels 22 of the type shown in FIG. 5. Control circuitry such as row control circuitry 26, control and processing circuitry 24, and/or column control circuitry 28 in FIG. 2 may operate image pixels 22 based on these timing diagrams (e.g., assert and de-assert the control signals shown in FIGS. 7A and 7B). These timing diagrams are merely illustrative. If desired, any suitable modifications may be made to accommodate for additional functions, timing requirements, changes in the configuration of pixels 22 such as changes in pixel 22 in FIG. 5 to implement pixels 22 shown in FIGS. 3, 4, and 6, etc.

As shown in FIG. 7A, (row) control circuitry may assert control signals res_Clg, tx_lg, and res_fd (as indicated by assertions A, B, and C), respectively for transistors 91, 78, and 95 in FIG. 5, to reset capacitor 88, photodiode 50, and floating diffusion region 84 in FIG. 5 to one or more reference voltages (e.g., a power supply voltage, a grounding voltage, or any other reference voltage). Control signal res_fd may remain asserted throughout the timing diagram in FIG. 7A.

Alternatively, if desired, control signal res_fd may be deasserted during this "reset PD/Clg" time period (sometimes referred to as a reset time period). In this case, control signal res_fd may be asserted after an integration time period, during a "clear SG/Clgst" time period (sometimes referred to as an additional reset time period), and before a sample period (as indicated by assertion C'). In other words, assertion C' may be an alternative to the continuous assertion C of signal res_fd. Additionally, if desired, assertion A may last longer and may completely overlap assertion B.

After the reset period associated with assertions A, B, and C, photodiode 50 may begin generating charge in response to incident light during an integration time period (in this case, similar to the above-mentioned exposure time period). During the integration time period, transistor 78 may provide an overflow potential barrier as described in connection with FIG. 5 to store and accumulate (or integrate) overflow charge (if any) at capacitor 88.

After the integration time period, control circuitry may assert control signals res_fd, conn_fd, and tx1 (as indicated by assertions C or C', D, and E), respectively for transistors 95, 60, and 92 in FIG. 5, to reset floating diffusion region 84, capacitor 62, and storage gate 82 in FIG. 5 to one or more reference voltages (e.g., a power supply voltage).

If desired, assertion C', if used instead of assertion C, may last longer than assertion E. If desired, control signal conn_fd may remain asserted after the additional reset period and during the sample time period (as indicated by assertion D'). In other words, assertion D' may be an extension (instead of an alternative) to assertion D.

After the additional reset period associated with assertions C or C', D, and E, control circuitry may assert control signals sg, tx0, conn_lg (as indicated by assertions F, G, and H), respectively for storage gate 82 and transistors 76 and 90 in FIG. 5, to provide (e.g., convey) overflow charge from capacitor 88 to capacitor 62 and to provide (e.g. convey) the remaining charge from photodiode 50 to storage gate 82 in FIG. 5. This may be referred to as a sample or sampling time period.

If desired, control signal tx1 may be partially asserted (e.g., at a voltage level between an assertion voltage level and a deassertion voltage level) during the sampling time period (as indicated by assertion E' as an extension of assertion E). If desired, assertion E' may last longer than assertion F, which may last longer than assertion G. If desired, control circuitry may assert control signal tx_lg during the sample time period (as indicated by assertion B', which is in addition to assertion B). In this case, assertion B' may occur after assertions E', F, and G. If desired, control signal conn_lg may remain asserted during assertion B' (as indicated by assertion H' as an extension of assertion H), and assertion D' may also overlap assertion B'. If desired, the falling edge of assertion H' may be a slow downward ramp, and may be before the falling edge of assertion D'.

The timing diagram in FIG. 7A may be used to operate pixels 22 in a global shutter operation, where all of the active pixels 22 may be controlled simultaneously based on the timing diagram of FIG. 7A. After the global shutter operation, control circuitry may perform readout operations in a row-wise manner (e.g., as a row-by-row readout) using the timing diagram of FIG. 7B.

As shown in FIG. 7B, (row) control circuitry may assert control signal sel (as indicated by assertion I), for transistor 64 in FIG. 5, to select a row of pixels, for which readout operations are to be performed. Control signal sel for the row may remain asserted throughout the timing diagram of FIG. 7B.

First, control circuitry may assert control signal conn_fd (as indicated by assertion J) to connect capacitor 62 to floating diffusion region 84 in FIG. 5. Floating diffusion region 84 already have been reset before assertion J. Control circuitry may control (using control signal SH) sample-and-hold circuitry to store a (low gain) image signal associated with the overflow charge portion (as indicated by assertion K).

Second, control circuitry may assert control signal res_fd (as indicated by assertion L) to reset floating diffusion region 84 in FIG. 5. Control circuitry may subsequently control sample-and-hold circuitry to store a reset level signal associated with the low gain image signal (as indicated by assertion M). Control signal conn_fd may remain asserted from assertion K to assertion M.

Third, control circuitry may control sample-and-hold circuitry to store another reset level signal associated with a high gain image signal (as indicated by assertion N). Before assertion N and after assertion M, control circuitry may again assertion control signal res_fd (as indicated by assertion L' in addition to assertion L), if desired.

Fourth, control circuitry may assert control signal tx1 (as indicated by assertion O) to transfer the remaining charge portion from storage gate 82 to floating diffusion region 84 in FIG. 5. Control circuitry may subsequently control sample-and-hold circuitry to store an additional (high gain) image signal associated with the remaining charge portion (as indicated by assertion P).

Various embodiments have been described illustrating imaging systems and methods for improving high dynamic range functionalities.

As an example, an image sensor pixel may include a photosensitive element, a floating diffusion region coupled to the photosensitive element, a first charge storage structure interposed between the photosensitive element and the floating diffusion region along a first path, a second charge storage structure interposed between the photosensitive element along a second path separate from the first path, and a third charge storage structure coupled to a node between the second charge storage structure and the floating diffusion region along the second path. If desired, the second charge storage structure may be a first capacitor, the third charge storage structure may be a second capacitor having a capacitance within 20% of a capacitance of the first capacitor, and the first storage structure may be a storage gate.

In desired, the image sensor pixel may further include a first transistor interposed between the storage gate and the floating diffusion region, a second transistor interposed between the photosensitive element and the first capacitor, a third transistor interposed between the first capacitor and the second capacitor, a fourth transistor interposed between the second capacitor and the floating diffusion region, a source follower transistor, and a row select transistor, the source follower transistor and the row select transistor coupling the floating diffusion region to a pixel output path. If desired, the third transistor may couple the second charge storage structure to the node, the fourth transistor may couple the floating diffusion region to the node, and an additional transistor may couple the third charge storage structure to the node.

If desired, the second charge storage structure may be configured to accumulate a first portion of the generated charge for a low gain signal, the first charge storage structure may be configured to store a second portion of the generated charge for a high gain signal, and the third charge storage structure may be configured to store the first portion of the generated charge for the low gain signal. If desired, the fourth transistor may be configured to be activated and the third transistor may be configured to be deactivated during a readout operation for the first portion of the generated charge. If desired, the second transistor may be configured to provide a potential barrier that determines the first portion of the generated charge for the low gain signal.

If desired, a charge storage terminal of the third charge storage structure may be at the node between the second charge storage structure and the floating diffusion structure along the second path. If desired, the charge storage terminal of the third charge storage structure may be interposed along a floating diffusion region reset path. Alternatively, if desired, the charge storage terminal of the third charge storage structure may be separated from a floating diffusion region reset path.

As another example, an image sensor may include an array of image sensor pixels. Each image sensor pixel in the array may include a photosensitive element, a floating diffusion region coupled to the photosensitive element, first, second, and third charge storage structures, a first transistor that couples the first charge storage structure to the floating diffusion region, a second transistor that couples the second charge storage structure to the third charge storage structure, and a third transistor that couples the third charge storage structure to the floating diffusion region. If desired, each image sensor pixel in the array may include a lateral overflow drain coupling the photosensitive element to a voltage source providing a supply voltage.

As yet another example, an image sensor pixel may include a photosensitive element, a floating diffusion region coupled to the photosensitive element, first, second, and third charge storage regions, a first transistor that couples the second charge storage structure to the third charge storage structure, and a second transistor that couples the third charge storage structure to the floating diffusion region. If desired, the image sensor pixel may include a third transistor that is directly coupled to the floating diffusion region and forms a reset path for the floating diffusion region, a reset path for the first charge storage structure, and a reset path for the third charge storage structure. If desired, the image sensor pixel may include a fourth transistor that is directly coupled to the second charge storage structure and forms a reset path for the photosensitive element and a reset path for the second charge storage structure.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor pixel comprising:
   a photosensitive element;
   a floating diffusion region;
   first and second separate paths coupled in parallel between the photosensitive element to the floating diffusion region, an end of the first path being directly coupled to the photosensitive element and an end of the second path being directly coupled to the photosensitive element;
   a first charge storage structure coupled along the first path between the photosensitive element and the floating diffusion region;
   a second charge storage structure coupled along the second path between the photosensitive element and the floating diffusion region; and
   a third charge storage structure coupled along the second path between the second charge storage structure and the floating diffusion region.

2. The image sensor pixel defined in claim 1 further comprising:
   a transistor coupled between the third charge storage structure and the floating diffusion region.

3. The image sensor pixel defined in claim 1, wherein the second charge storage structure is configured to receive charge associated with a low gain signal, and the first charge storage structure is configured to receive additional charge associated with a high gain signal.

4. The image sensor pixel defined in claim 3, wherein the third charge storage structure is configured to receive the charge associated with the low gain signal and to perform a charge sharing operation with the floating diffusion region using the charge associated with the low gain signal.

5. The image sensor pixel defined in claim 1 further comprising:
   a transistor coupled between the second charge storage structure and the third charge storage structure and configured to transfer charge from the second charge storage structure to the third charge storage structure.

6. The image sensor pixel defined in claim 5 further comprising:
   an additional transistor coupled between the third charge storage structure and the floating diffusion region, wherein the transistor is configured to be deactivated during a readout operation for the charge, and the additional transistor is configured to be activated during the readout operation for the charge.

7. The image sensor pixel defined in claim 1 further comprising:
   a first transistor coupled along the first path and coupled between the photosensitive element and the first charge storage structure; and
   a second transistor coupled along the second path and coupled between the photosensitive element and the second charge storage structure.

8. The image sensor pixel defined in claim 1, wherein the second charge storage structure comprises a first capacitor, and the third charge storage structure comprises a second capacitor.

9. The image sensor pixel defined in claim 8, wherein the first capacitor has a first terminal coupled along a first portion of the second path between the photosensitive element and the second charge storage structure, the second capacitor has a first terminal coupled along a second portion of the second path between the second charge storage structure and the floating diffusion region, and the first and second capacitors each have a corresponding second terminal coupled to a reference voltage source.

10. The image sensor pixel defined in claim 8, wherein the first charge storage structure comprises a storage gate.

11. The image sensor pixel defined in claim 10 further comprising:
    a first transistor coupled between the storage gate and the floating diffusion region;
    a second transistor coupled between the photosensitive element and the first capacitor;
    a third transistor coupled between the first capacitor and the second capacitor; and
    a fourth transistor coupled between the second capacitor and the floating diffusion region.

12. The image sensor pixel defined in claim 11 further comprising:
    a source follower transistor; and
    a row select transistor, the source follower transistor and the row select transistor coupling the floating diffusion region to a pixel output path.

13. The image sensor pixel defined in claim 1, wherein the third charge storage structure has a charge storage terminal that is on the second path.

14. The image sensor pixel defined in claim 13, wherein the charge storage terminal of the third charge storage structure is on a floating diffusion region reset path.

15. The image sensor pixel defined in claim 13, wherein the charge storage terminal of the third charge storage structure is separated from a floating diffusion region reset path.

16. The image sensor pixel defined in claim 1 further comprising:
- a first transistor that couples the second charge storage structure to a node on the second path between the second charge storage structure and the floating diffusion region;
- a second transistor that couples the third charge storage structure to the node; and
- a third transistor that couples the floating diffusion region to the node.

17. An image sensor comprising:
an array of image sensor pixels, an image sensor pixel in the array including:
- a photosensitive element;
- a floating diffusion region;
- first, second, and third charge storage structures, the first charge storage structure being coupled between the photosensitive element and the floating diffusion region;
- a first transistor that couples the photosensitive element to the second charge storage structure, the photosensitive element being coupled between the first transistor and the first charge storage structure;
- a second transistor that couples the second charge storage structure to the third charge storage structure; and
- a third transistor that couples the third charge storage structure to the floating diffusion region.

18. The image sensor defined in claim 17, wherein the image sensor pixel in the array includes a lateral overflow drain coupling the photosensitive element to a voltage source providing a supply voltage.

19. An image sensor pixel comprising:
- a photosensitive element;
- a floating diffusion region;
- a first charge storage structure coupled between the photosensitive element and the floating diffusion region;
- a second charge storage structure, the photosensitive element being coupled between the first and second charge storage structures;
- a third charge storage structure;
- a first transistor that couples the second charge storage structure to the third charge storage structure; and
- a second transistor that couples the third charge storage structure to the floating diffusion region.

20. The image sensor pixel defined in claim 19, further comprising:
- a third transistor that is directly coupled to the floating diffusion region and forms a reset path for the floating diffusion region; and
- a fourth transistor that is directly coupled to the second charge storage structure and forms a reset path for the second charge storage structure.

* * * * *